United States Patent
Omura et al.

(10) Patent No.: US 12,218,366 B2
(45) Date of Patent: Feb. 4, 2025

(54) BUSBAR AND BATTERY LAMINATE

(71) Applicant: Panasonic Intellectual Property Management Co., Ltd., Osaka (JP)

(72) Inventors: Tetsuji Omura, Hyogo (JP); Masaya Ugaji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/309,267

(22) Filed: Apr. 28, 2023

(65) Prior Publication Data
US 2023/0268596 A1    Aug. 24, 2023

Related U.S. Application Data

(63) Continuation of application No. 16/639,084, filed as application No. PCT/JP2018/045028 on Dec. 7, 2018, now Pat. No. 11,677,114.

(30) Foreign Application Priority Data

Dec. 19, 2017  (JP) ................... 2017-243049

(51) Int. Cl.
  *H01M 50/509*  (2021.01)
  *H01M 50/209*  (2021.01)
  (Continued)

(52) U.S. Cl.
  CPC ....... *H01M 50/209* (2021.01); *H01M 50/505* (2021.01); *H01M 50/509* (2021.01);
  (Continued)

(58) Field of Classification Search
  CPC .................. H01M 50/502; H01M 50/543
  See application file for complete search history.

(56) References Cited

U.S. PATENT DOCUMENTS

2011/0076521 A1    3/2011 Shimizu et al.
2011/0223776 A1    9/2011 Ferber, Jr.
(Continued)

FOREIGN PATENT DOCUMENTS

CN    105609691 B    9/2020
JP    2016-027578    2/2016
(Continued)

OTHER PUBLICATIONS

International Search Report of PCT application No. PCT/JP2018/045028 dated Mar. 12, 2019.
(Continued)

*Primary Examiner* — Maria Laios
*Assistant Examiner* — Jordan E Berresford
(74) *Attorney, Agent, or Firm* — Rimon P.C.

(57) ABSTRACT

A battery module includes: a plurality of batteries stacked together; and a busbar that electrically connects the plurality of batteries with each other. The busbar has: a main body that extends along axis X along which the batteries are stacked together; and a plurality of connectors that protrude from the main body along an axis that intersects with the axis along which the batteries are stacked together, and are electrically connected with terminals of the batteries, respectively. The plurality of batteries are divided into a plurality of battery units. Each of the plurality of battery units includes at least two of the plurality of batteries. The busbar connects the at least two of the plurality of batteries of each of the battery units with each other in parallel. The busbar connects the battery units with each other in series.

9 Claims, 7 Drawing Sheets

(51) Int. Cl.
*H01M 50/505* (2021.01)
*H01M 50/522* (2021.01)
*H01M 50/55* (2021.01)
*H01M 50/553* (2021.01)
*H01M 50/264* (2021.01)
*H01M 50/293* (2021.01)

(52) U.S. Cl.
CPC ........ *H01M 50/522* (2021.01); *H01M 50/264* (2021.01); *H01M 50/293* (2021.01); *H01M 50/55* (2021.01); *H01M 50/553* (2021.01)

(56) References Cited

U.S. PATENT DOCUMENTS

| | | | |
|---|---|---|---|
| 2015/0380711 | A1 | 12/2015 | Oechsle et al. |
| 2018/0108955 | A1 | 4/2018 | Fees et al. |
| 2018/0130990 | A1 | 5/2018 | Liu et al. |
| 2019/0379015 | A1* | 12/2019 | Ochi .................. H01M 50/505 |

FOREIGN PATENT DOCUMENTS

| | | |
|---|---|---|
| JP | 2018-078782 | 5/2018 |
| WO | 2017/130706 | 8/2017 |

OTHER PUBLICATIONS

English Translation of Chinese Office Action dated Apr. 24, 2022 for the related Chinese Patent Application No. 201880053596.8.
Non-Final Office Action dated Aug. 30, 2021 issued in U.S. Appl. No. 16/639,084.
Final Office Action dated Apr. 12, 2022 issued in U.S. Appl. No. 16/639,084.
Non-Final Office Action dated Sep. 6, 2022 issued in U.S. Appl. No. 16/639,084.
Notice of Allowance dated Feb. 6, 2023 issued in U.S. Appl. No. 16/639,084.

* cited by examiner

BUSBAR AND BATTERY LAMINATE

CROSS-REFERENCE OF RELATED APPLICATIONS

This application is a Continuation of U.S. patent application Ser. No. 16/639,084, filed on Feb. 13, 2020, which is the U.S. National Phase under 35 U.S.C. § 371 of International Patent Application No. PCT/JP2018/045028, filed on Dec. 7, 2018, which claims the benefit of Japanese Patent Application No. 2017-243049, filed on Dec. 19, 2017, the entire disclosures of which Applications are incorporated by reference herein.

TECHNICAL FIELD

The present invention relates to a busbar and a battery module.

BACKGROUND ART

A battery module is known as a battery used as a power source that needs to generate high voltage. The power source that needs to generate high voltage is used for a vehicle, for example. The battery module includes a plurality of batteries electrically connected with each other. In such a conventional battery module, terminals of batteries that are adjacent to each other are connected with each other by a busbar. For example, PTL 1 discloses a battery module. The battery module includes a plurality of batteries. Busbars connect the plurality of batteries with each other in parallel to form a plurality of battery units. The busbars connect the battery units with each other in series. Such a configuration reduces a number of components, such as voltage detection lines, and reduces cost of a battery device, compared with a case in which battery modules are connected with each other in parallel, and each of the battery modules includes batteries connected with each other in series by busbars.

CITATION LIST

Patent Literature

PTL 1: Unexamined Japanese Patent Publication No. 2016-27578

SUMMARY OF THE INVENTION

The inventors of the present invention have earnestly studied configurations that each connect batteries in parallel and series in a battery module. Consequently, the inventors of the present invention have recognized following problems. That is to say, since batteries are connected with each other in parallel, electric current that flows through busbars increases. Therefore, power of heating generated by the busbars increases. Especially in recent years, battery modules need to produce high power and deal with rapid charging. Consequently, electric current that flows through busbars is further increasing. Consequently, power of heating generated by busbars is increasing. If power of heating generated by busbars increases, heat may be transferred from the busbars to batteries. Consequently, temperatures of the batteries may rise. Consequently, the batteries may less efficiently generate electricity.

The present invention is made in view of the above situation. It is an object of the present invention to provide a technique that allows heat generated by busbars to have a weaker influence on batteries.

An aspect of the present invention is a battery module. The battery module includes: a plurality of batteries stacked together; and a busbar that electrically connects the plurality of batteries with each other. The busbar has: a main body that extends along an axis along which the batteries are stacked together; and a plurality of connectors that protrude from the main body along an axis that intersects with the axis along which the batteries are stacked together, and are electrically connected with terminals of the batteries, respectively. The plurality of batteries are divided into a plurality of battery units. Each of the plurality of battery units includes at least two of the plurality of batteries. The busbar connects the at least two of the plurality of batteries of each of the battery units with each other in parallel. The busbar connects the battery units with each other in series.

Another aspect of the present invention is a busbar. The busbar electrically connects a plurality of batteries stacked together with each other. The busbar has: a main body that extends along an axis along which the batteries are stacked together; and a plurality of connectors that protrude from the main body along an axis that intersects with the axis along which the batteries are stacked together, and are electrically connected with terminals of the batteries, respectively.

Any combination of the above components is also an effective aspect of the present invention. Further, the present invention is expressed in forms of methods, devices, and systems. The methods, devices, and systems are also effective aspects of the present invention.

The present invention allows heat generated by the busbar to have a weaker influence on batteries.

DESCRIPTION OF EMBODIMENTS

Figure 1:
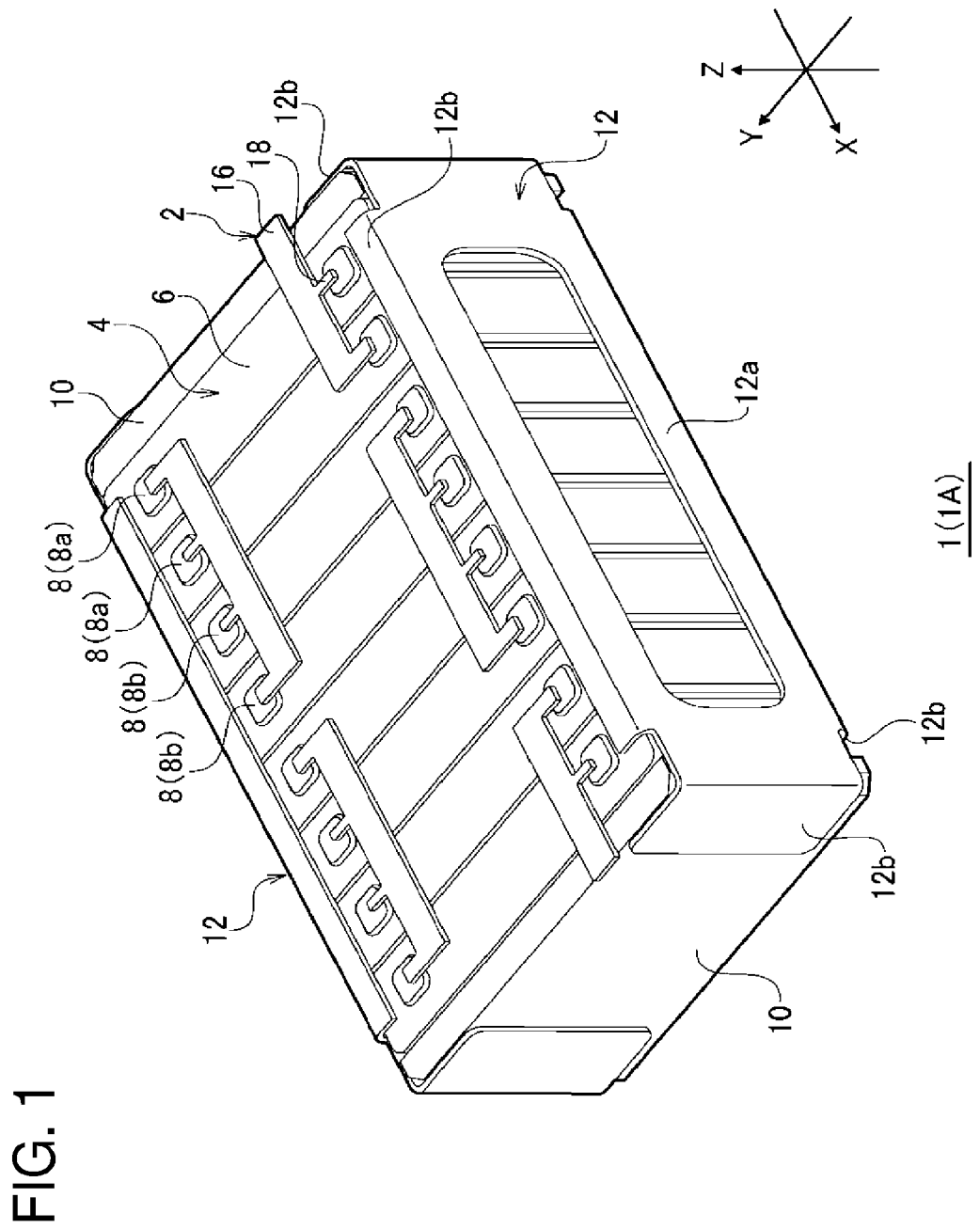
FIG. 1 is a schematic perspective view that illustrates a configuration of a battery module according to a first exemplary embodiment.

Hereinafter, the present invention will be described based on preferred exemplary embodiments with reference to the drawings. The exemplary embodiments are exemplifications and do not limit the invention. All features described in the exemplary embodiments and combinations of the features are not necessarily essential to the invention. The same reference marks are assigned to the same or equivalent components, members, and processes illustrated in the drawings. Explanation for the same or equivalent components, members, and processes will not be repeated as appropriate. For convenience, scales or shapes of portions illustrated in the drawings are determined to facilitate explanation of the portions. The scales or shapes of the portions should not be interpreted as limitation unless otherwise mentioned. Further, some components may be illustrated on slightly different scales in different drawings. Further, if terms "first", "second", and the like are used in the present description or claims, the terms "first", "second", and the like do not mean any order or importance, but are used to distinguish between one configuration and another configuration unless otherwise mentioned.

First Exemplary Embodiment

FIG. 1 is a schematic perspective view that illustrates a configuration of a battery module according to a first exemplary embodiment. Battery module (=battery stack) 1 (1A) includes a plurality of busbars 2, and a plurality of batteries 4 electrically connected with each other by busbars 2.

For example, each of batteries 4 is a rechargeable secondary battery, such as a lithium-ion battery, a nickel-metal hydride battery, or a nickel-cadmium battery. Each of batteries 4 is what is called a prismatic (=rectangular) battery. Each of batteries 4 has an exterior can that has a shape like a flat rectangular prism. One side of the exterior can has a substantially rectangular opening that is not illustrated. Electrodes and electrolyte are inserted into the exterior can through the opening. Sealing sheet 6 is attached to the opening of the exterior can. Sealing sheet 6 seals the exterior can. Positive terminal 8 protrudes from one of two lengthways ends of sealing sheet 6. Negative terminal 8 protrudes from the other lengthways end of sealing sheet 6. Hereinafter, positive terminal 8 is referred to as positive terminal 8a, as appropriate. Further, negative terminal 8 is referred to as negative terminal 8b, as appropriate. If polarity of terminals 8 does not need to be distinguished, positive terminals 8a and negative terminals 8b are collectively referred to as terminals 8.

Terminals 8 protrude from respective openings of sealing sheet 6. A gasket as a seal is disposed between a periphery of each of terminals 8 and the opening of sealing sheet 6. The gasket tightly fills a gap between sealing sheet 6 and terminal 8. Further, the gasket does not allow a short circuit between sealing sheet 6 and terminal 8. The exterior can, sealing sheet 6, and terminals 8 are electrical conductors, and are made of metal, for example. The gasket is an insulator and is made of resin, for example. Sealing sheet 6 includes a safety valve (not illustrated) between the pair of terminals 8. If a pressure rises to or above a predetermined value in the exterior can, the safety valve opens to release gas in the exterior can.

In the present exemplary embodiment, a top of battery 4 includes sealing sheet 6, and a bottom of battery 4 is opposite the top of battery 4. Further, battery 4 has two main sides that each connect the top of battery 4 with the bottom of battery 4. Of six sides of battery 4, the main sides each have the largest area. In addition to the top, the bottom, and the two main sides, battery 4 has two sides. The tops of batteries 4 constitute a top of battery module 1. The bottoms of batteries 4 constitute a bottom of battery module 1. The sides of batteries 4 constitute sides of battery module 1. For convenience, assume that the top of battery module 1 is a vertically upper side of battery module 1, and the bottom of battery module 1 is a vertically lower side of battery module 1.

The plurality of batteries 4 are stacked together at predetermined intervals. Main sides of batteries 4 that are adjacent to each other are in contact with each other. The terms "stacked together" mean that a plurality of components are arranged along any one axis. Therefore, stacking batteries 4 together may mean horizontally arranging the plurality of batteries 4. Further, batteries 4 are arranged in such a manner that terminals 8 face in a same direction. For convenience, terminals 8 face upward along vertical axis Z (an axis indicated by arrow Z in FIG. 1).

Each of busbars 2 is an elongated metal component. The plurality of batteries 4 are stacked together, and electrically connected with each other by busbars 2. Busbars 2 are made of a metal, such as copper or aluminum. For example, busbars 2 are welded to terminals 8 of batteries 4. A configuration of busbars 2 will be described later. Further, it will be described later how busbars 2 connect batteries 4 with each other.

Battery module 1 includes a plurality of separators not illustrated. The separators are also referred to as insulating spacers. The separators are made of a resin that has an insulation property, for example. For example, the separators are made of a thermoplastic resin, such as polypropylene (PP), polybutylene terephthalate (PBT), a polycarbonate (PC), NORYL (registered trademark) resin (modified polyphenylene ether (PPE)). The separators are arranged between batteries 4, and are arranged between battery 4 and each of end plates 10, respectively. End plates 10 will be described later. Consequently, exterior cans of batteries 4 that are adjacent to each other are insulated from each other. Further, the exterior cans of batteries 4 are insulated from end plates 10.

Battery module 1 also includes the pair of end plates 10. End plates 10 are each made of a metal sheet, for example. The plurality of batteries 4 and the plurality of separators that have been stacked together are disposed between the pair of end plates 10. The pair of end plates 10 are each disposed along axis X along which batteries 4 are stacked together (an axis indicated by arrow X in FIG. 1). The pair of end plates 10 are adjacent to outermost batteries 4, respectively. However, the separator is between each of the pair of end plates 10 and outermost battery 4. Outermost busbars 2 along axis X along which batteries 4 are stacked together function as terminals connectable with other components.

Battery module 1 also includes a pair of binding components 12. The pair of binding components 12 bind batteries 4, the separators, and end plates 10 that have been stacked together. The pair of binding components 12 are also referred to as binding bars. The pair of binding components 12 are each disposed along horizontal axis Y (an axis indicated by arrow Y in FIG. 1) that is perpendicular to axis X along which the plurality of batteries 4 are stacked together. Along horizontal axis Y, terminals 8 are arranged in each of batteries 4. Each of binding components 12 has flat portion 12a and bent portions 12b. Flat portion 12a is rectangular and is parallel to sides of batteries 4. Bent portions 12b protrude from ends of sides of flat portion 12a, respectively, toward batteries 4. For example, each of binding components 12 is a rectangular metal sheet whose sides are bent.

Two bent portions 12b that are opposite each other along axis X along which batteries 4 are stacked together are fixed to the pair of end plates 10, respectively, with screws, for example. Consequently, the pair of end plates 10 and the pair of binding components 12 bind the plurality of batteries 4 and the plurality of separators together. Binding components 12 bind the plurality of batteries 4 along axis X along which batteries 4 are stacked together. Consequently, binding components 12 position the plurality of batteries 4 along axis X along which batteries 4 are stacked together. Further, bottoms of the plurality of batteries 4 are in contact with lower bent portions 12b of binding components 12. However, separators are disposed between the bottoms of the plurality of batteries 4 and lower bent portions 12b of binding components 12. Tops of the plurality of batteries 4 are in contact with upper bent portions 12b of binding components 12. However, separators are disposed between the tops of the plurality of batteries 4 and upper bent portions 12b of binding components 12. Consequently, the plurality of batteries 4 are vertically positioned. Then busbars 2 are electrically connected with terminals 8 of batteries 4. Consequently, battery module 1 is made.

Figure 2:
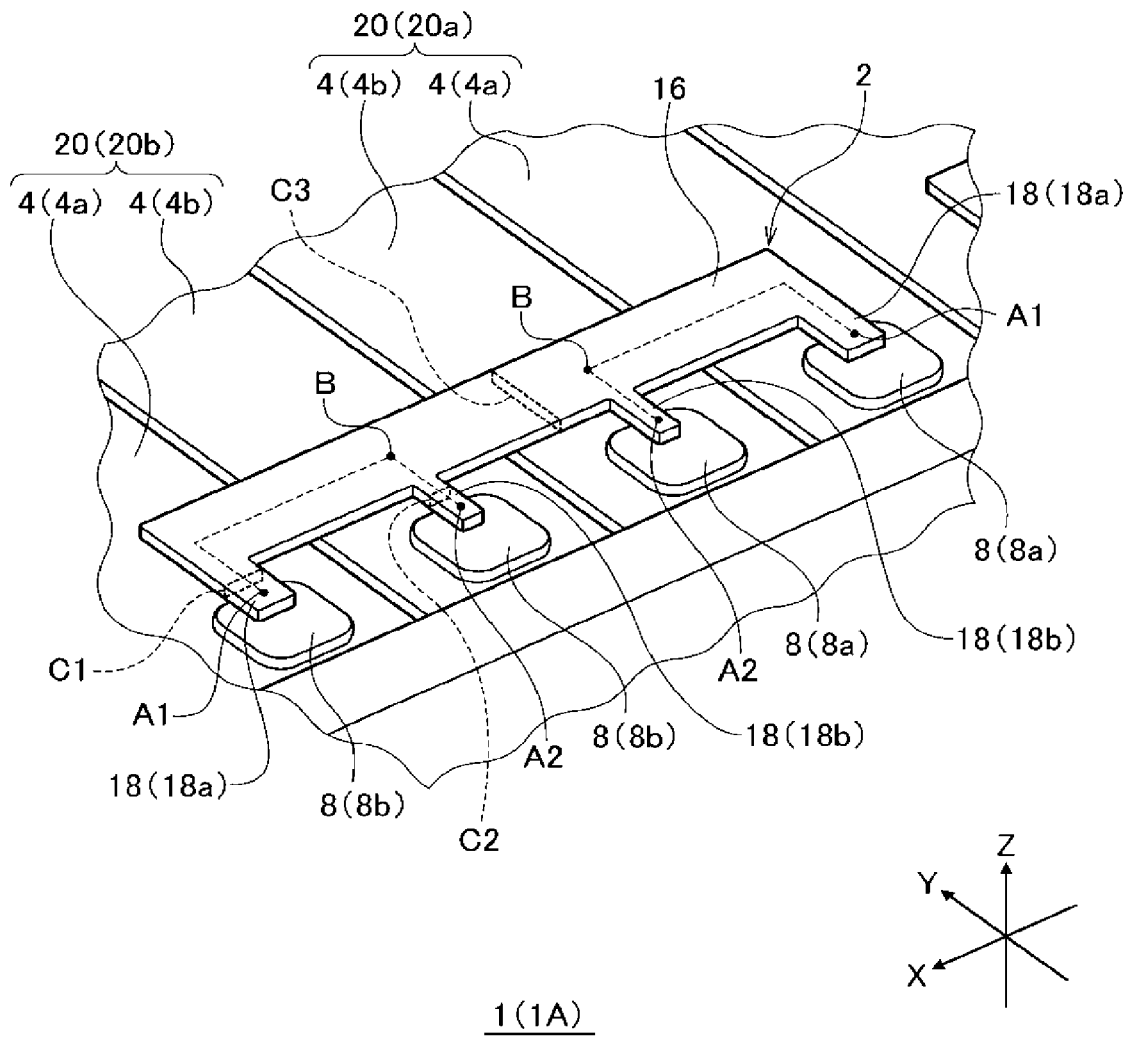
FIG. 2 is an enlarged perspective view that illustrates one of busbars in the battery module.

Next, a configuration of busbars 2 according to the present exemplary embodiment will be described in detail. Further, it will be described in detail how busbars 2 electrically connect batteries 4 with each other. FIG. 2 is an enlarged perspective view that illustrates one of the busbars in the battery module. Each of busbars 2 has main body 16 and a plurality of connectors 18. Main body 16 is elongated and extends along axis X along which batteries 4 are stacked together. The plurality of connectors 18 are electrically connected with terminals 8 of batteries 4, respectively. Connectors 18 are arranged at predetermined intervals along an axis along which main body 16 extends (axis X along which batteries 4 are stacked together). Connectors 18 protrude from main body 16 along an axis that intersects with axis X along which batteries 4 are stacked together (horizontal axis Y). Therefore, busbar 2 has a shape like a comb.

In the present exemplary embodiment, main body 16 of busbar 2 is closer to centers of batteries 4 along horizontal axis Y than terminals 8 are. Further, connectors 18 of busbar 2 protrude toward sides of batteries 4. That is to say, main body 16 is apart from terminals 8 of batteries 4. Main body 16 may be closer to sides of batteries 4 along horizontal axis Y than terminals 8 are.

The plurality of batteries 4 are divided into a plurality of battery units 20. Each of the plurality of battery units 20 includes at least two batteries 4. Busbars 2 connect batteries 4 of each of battery units 20 with each other in parallel. Further, busbars 2 connect battery units 20 with each other in series. In an example illustrated in FIG. 2, first battery unit 20a includes first battery 4a and second battery 4b that are stacked together in such a manner that positive terminal 8a of first battery 4a is adjacent to positive terminal 8a of second battery 4b, and negative terminal 8b of first battery 4a is adjacent to negative terminal 8b of second battery 4b. Similarly, second battery unit 20b includes first battery 4a and second battery 4b that are stacked together in such a manner that positive terminal 8a of first battery 4a is adjacent to positive terminal 8a of second battery 4b, and negative terminal 8b of first battery 4a is adjacent to negative terminal 8b of second battery 4b.

First battery unit 20a and second battery unit 20b are stacked together in such a manner that positive terminal 8a of first battery unit 20a is adjacent to negative terminal 8b of second battery unit 20b. Second battery 4b of each of battery units 20 is closer to the other battery unit 20 than first battery 4a of each of battery units 20 is. Connectors 18 of busbar 2 are connected with terminals 8, respectively. Consequently, busbar 2 connects first battery 4a and second battery 4b of each of battery units 20 with each other in parallel. Further, busbar 2 connects first battery unit 20a with second battery unit 20b in series.

The plurality of connectors 18 include first connectors 18a and second connectors 18b. First connector 18a is connected with first battery 4a of first battery unit 20a. First battery 4a of first battery unit 20a is apart from second battery unit 20b. Further, second connector 18b is connected with second battery 4b of first battery unit 20a. Second battery 4b of first battery unit 20a is adjacent to second battery unit 20b. First connection point A1 is a connection point where first connector 18a is connected with first battery 4a. Second connection point A2 is a connection point where second connector 18b is connected with second battery 4b. Third connection point B is a connection point where second connector 18b is connected with main body 16. First connector 18a and second connector 18b do not have a same shape, but have different shapes. Consequently, a difference in electrical resistance between a path from first connection point A1 to third connection point B and a path from second connection point A2 to third connection point B is reduced. Busbar 2 is similarly connected with batteries 4 of second battery unit 20b.

In the present exemplary embodiment, an area of a cross section of first connector 18a is different from an area of a cross section of second connector 18b. More specifically, a width (a dimension along axis X along which batteries 4 are stacked together) of second connector 18b is smaller than a width (a dimension along axis X along which batteries 4 are stacked together) of first connector 18a. A thickness (a dimension along vertical axis Z) of second connector 18b is equal to a thickness (a dimension along vertical axis Z) of first connector 18a. Consequently, area C2 of a cross section of second connector 18b along axis X along which batteries 4 are stacked together is smaller than area C1 of a cross section of first connector 18a along axis X along which batteries 4 are stacked together.

Area C1 of a cross section of first connector 18a along axis X along which batteries 4 are stacked together is smaller than area C3 of a cross section of main body 16 along an axis (horizontal axis Y) that intersects with axis X along which batteries 4 are stacked together. Further, area C2 of a cross section of second connector 18b along axis X along which batteries 4 are stacked together is smaller than area C3 of a cross section of main body 16 along an axis (horizontal axis Y) that intersects with axis X along which batteries 4 are stacked together. Busbar 2 has a section that connects battery units 20 with each other in series. Busbar 2 also has a section that connects batteries 4 with each other in parallel. Busbar 2 has a shape that allows the section of busbar 2 that connects battery units 20 with each other in series to have electrical resistance that is lower than electrical resistance of the section of busbar 2 that connects batteries 4 with each other in parallel.

The section of busbar 2 that connects battery units 20 with each other in series is a section of main body 16. The section of main body 16 is between two second connectors 18b. More specifically, the section of busbar 2 that connects battery units 20 with each other in series is a section between two third connection points B. One of two third connection points B is a point where one of two second connectors 18b is connected with main body 16. The other one of two third connection points B is a point where the other one of two second connectors 18b is connected with main body 16. The section of busbar 2 that connects batteries 4 with each other in parallel includes first connector 18a and second connector 18b that correspond to each of battery units 20. The section of busbar 2 that connects batteries 4 with each other in parallel also includes main body 16, but does not include a section of main body 16 that is between two third connection points B. Whole main body 16 has a uniform width and a uniform thickness. Area C1 of a cross section of first connector 18a is smaller than area C3 of a cross section of main body 16. Area C2 of a cross section of second connector 18b is smaller than area C3 of a cross section of main body 16. The section of busbar 2 that connects batteries 4 with each other in parallel includes connectors 18. However, the section of busbar 2 that connects battery units 20 with each other in series does not include connectors 18. Therefore, the section of busbar 2 that connects battery units 20 with each other in series has electrical resistance that is lower than electrical resistance of the section of busbar 2 that connects batteries 4 with each other in parallel.

As described above, battery module 1 according to the present exemplary embodiment includes the plurality of batteries 4, and busbars 2 that electrically connect the plurality of batteries 4 with each other. Each of busbars 2 has main body 16 that extends along axis X along which batteries 4 are stacked together. Each of busbars 2 also has the plurality of connectors 18 that are electrically connected with terminals 8 of batteries 4, respectively. A direction in which each of connectors 18 protrudes from main body 16 intersects with axis X along which batteries 4 are stacked together. Further, each of connectors 18 protrudes from main body 16 along XY plane. Ends of connectors 18 are connected with terminals 8, respectively. Consequently, main body 16 is not vertically over terminals 8.

The plurality of batteries 4 are divided into the plurality of battery units 20. Each of the plurality of battery units 20 includes at least two batteries 4. Busbars 2 connect batteries 4 of each of battery units 20 with each other in parallel. Busbars 2 connect battery units 20 with each other in series. Consequently, total electric current of batteries 4 connected with each other in parallel flows through part of main body 16. Power J of heating generated by busbar 2 is a value that is a product of a square of electric current I that flows through busbar 2 and resistance R of busbar 2 ($J=I^2R$). Each of connectors 18 generates power of heating ($I^2R$). Further, a section of main body 16 where electric current from one of batteries 4 flows generates power of heating ($I^2R$). Further, a section of main body 16 where total electric current from batteries 4 connected with each other in parallel flows generates power of heating that is a product of $I^2R$ and a square of a number of batteries 4 connected with each other in parallel. In case of the present exemplary embodiment, a section of main body 16 where total electric current from batteries 4 connected with each other in parallel flows generates power of heating that is $4 \times I^2R$ since two batteries 4 are connected with each other in parallel. Therefore, a temperature of main body 16 may significantly increase, and thus may have an influence on batteries 4.

To deal with the problem, each of busbars 2 has main body 16 that is parallel to axis X along which batteries 4 are stacked together, and connectors 18 that is parallel to horizontal axis Y. Connectors 18 are connected with terminals 8, respectively. Therefore, main body 16 that generates much power of heating is apart from terminals 8. Consequently, heat generated by busbars 2 has a weaker influence on batteries 4. Consequently, heat of busbars 2 less increases temperatures of batteries 4. Consequently, batteries 4 efficiently generate electricity. Further, since temperatures of batteries 4 are less increased, larger electric current is allowed to flow through busbars 2.

The gaskets disposed between terminals 8 and sealing sheets 6 are especially relatively easily affected by heat. Therefore, it is important to allow temperatures of terminals 8 to be less increased by heat of busbars 2. Busbars 2 according to the present exemplary embodiment allow temperature of terminals 8 to be less increased. Consequently, the gaskets do not melt. Consequently, each of the gaskets tightly seals between terminal 8 and sealing sheet 6.

The plurality of connectors 18 include first connectors 18a and second connectors 18b. The plurality of battery units 20 include first battery unit 20a and second battery unit 20b that are connected with each other in series by busbars 2. First battery unit 20a includes first battery 4a connected with first connector 18a, and second battery 4b connected with second connector 18b. Second battery 4b is closer to second battery unit 20b than first battery 4a is. Since second battery 4b is closer to second battery unit 20b than first battery 4a is, a path through which electricity flows from second battery 4b to second battery unit 20b is shorter than a path through which electricity flows from first battery 4a to second battery unit 20b. Therefore, if first connector 18a and second connector 18b had a same shape, the two paths through which electricity flows would have different electrical resistance. Consequently, first battery 4a and second battery 4b would not be uniformly consumed.

First connector 18a and second connector 18b have respective particular shapes. The respective particular shapes reduce a difference in electrical resistance between a path from first connection point A1 where first connector 18a is connected with battery 4 to third connection point B where second connector 18b is connected with main body 16 and a path from second connection point A2 where second connector 18b is connected with battery 4 to third connection point B where second connector 18b is connected with main body 16. In the present exemplary embodiment, an area of a cross section of first connector 18a is different from an area of a cross section of second connector 18b. Consequently, a difference in electrical resistance between the paths through which electricity flows is reduced. More specifically, an area of a cross section of second connector 18b is smaller than an area of a cross section of first connector 18a. Consequently, the shorter path through which electricity flows includes second connector 18b whose electrical resistance is increased. Consequently, a difference in electrical resistance between the paths through which electricity flows is reduced. Consequently, batteries 4 are more uniformly consumed.

Area C1 of a cross section of first connector 18a along axis X along which batteries 4 are stacked together is smaller than area C3 of a cross section of main body 16 along an axis that intersects with axis X along which batteries 4 are stacked together. Further, area C2 of a cross section of second connector 18b along axis X along which batteries 4 are stacked together is smaller than area C3 of a cross section of main body 16 along an axis that intersects with axis X along which batteries 4 are stacked together. Consequently, heat that has been generated by main body 16 is less transferred to batteries 4 through connectors 18. Further, the section of busbar 2 that connects battery units 20 with each other in series has electrical resistance that is lower than electrical resistance of the section of busbar 2 that connects batteries 4 with each other in parallel. Consequently, the section of busbar 2 that connects battery units 20 with each other in series generates less heat.

Second Exemplary Embodiment

A battery module according to a second exemplary embodiment and the battery module according to the first exemplary embodiment have a same configuration except for a difference in configuration between respective busbars. Hereinafter, a difference in configuration between the battery module according to the present exemplary embodiment and the battery module according to the first exemplary embodiment will be mainly described. A same configuration will be simply described, or will not be described.

Figure 3:
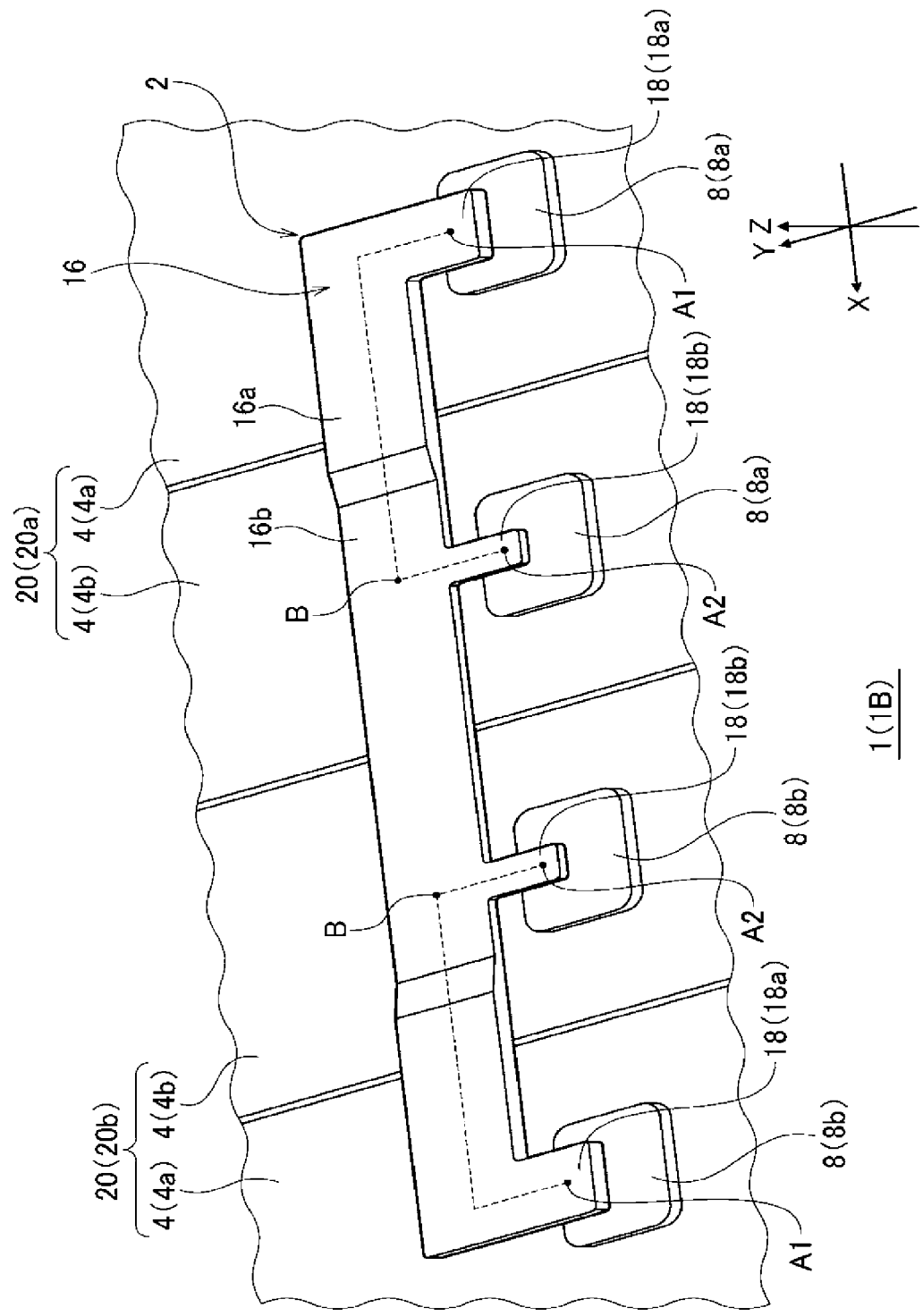
FIG. 3 is an enlarged perspective view that illustrates one of busbars in a battery module according to a second exemplary embodiment.

FIG. 3 is an enlarged perspective view that illustrates one of busbars in the battery module according to the second exemplary embodiment. In the present exemplary embodiment, battery module 1 (1B) includes busbars 2. Each of busbars 2 has main body 16 and a plurality of connectors 18. Main body 16 extends along axis X along which batteries 4 are stacked together. The plurality of connectors 18 are electrically connected with terminals 8 of batteries 4, respectively. Connectors 18 are arranged at predetermined intervals along an axis along which main body 16 extends (axis X along which batteries 4 are stacked together). Connectors 18 protrude from main body 16 along an axis that intersects with axis X along which batteries 4 are stacked together (horizontal axis Y).

Battery module 1 includes first battery unit 20a and second battery unit 20b. First battery unit 20a includes first battery 4a and second battery 4b that are stacked together. Second battery unit 20b includes first battery 4a and second battery 4b that are stacked together. Busbar 2 connects first battery 4a and second battery 4b of each of battery units 20 with each other in parallel. Further, busbar 2 connects first battery unit 20a with second battery unit 20b in series.

The plurality of connectors 18 include first connectors 18a and second connectors 18b. First connector 18a is connected with first battery 4a of first battery unit 20a. First battery 4a of first battery unit 20a is apart from second battery unit 20b. Further, second connector 18b is connected with second battery 4b of first battery unit 20a. Second battery 4b of first battery unit 20a is adjacent to second battery unit 20b. First connector 18a and second connector 18b do not have a same shape, but have different shapes. Consequently, a difference in electrical resistance between a path from first connection point A1 to third connection point B and a path from second connection point A2 to third connection point B is reduced. Busbar 2 is similarly connected with batteries 4 of second battery unit 20b.

In the present exemplary embodiment, an area of a cross section of first connector 18a is different from an area of a cross section of second connector 18b. More specifically, a thickness (a dimension along vertical axis Z) of second connector 18b is smaller than a thickness (a dimension along vertical axis Z) of first connector 18a. Consequently, an area of a cross section of second connector 18b is smaller than an area of a cross section of first connector 18a. Further, main body 16 has thick portions 16a and thin portion 16b. Thick portions 16a are connected with first connectors 18a, respectively. Thick portions 16a have a thickness that is equal to a thickness of first connectors 18a. Thin portion 16b is connected with second connectors 18b. Thin portion 16b has a thickness that is equal to a thickness of second connectors 18b.

Heat generated by busbars 2 of battery module 1 according to the present exemplary embodiment has a weaker influence on batteries 4. Further, each of busbars 2 of battery module 1 according to the present exemplary embodiment reduces a difference in electrical resistance between a path through which electricity flows from first battery 4a to second battery unit 20b and a path through which electricity flows from second battery 4b to second battery unit 20b. Consequently, batteries 4 are more uniformly consumed.

Figure 4:
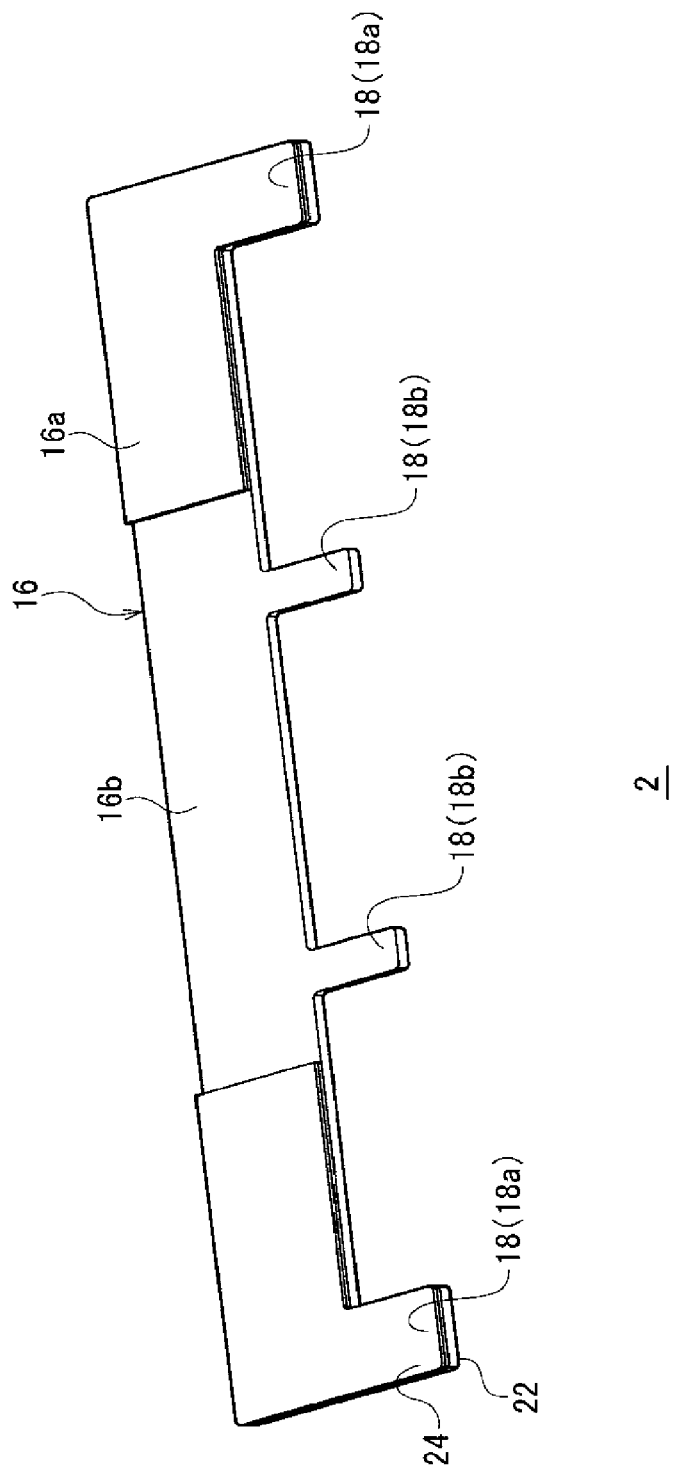
FIG. 4 is a schematic perspective view that illustrates a configuration of one of busbars of a battery module according to an example of variations.

Hereinafter, an example of variations on battery module 1 according to the second exemplary embodiment will be described. FIG. 4 is a schematic perspective view that illustrates a configuration of one of busbars of a battery module according to the example of variations. Busbar 2 of battery module 1 according to the present example of variations includes first sheet 22 and second sheets 24. First sheet 22 and each of second sheets 24 are stacked together. In a plan view, first sheet 22 has a shape that corresponds to whole main body 16 and whole connectors 18. In a plan view, each of second sheets 24 has a shape that corresponds to thick portion 16a and first connector 18a. Consequently, a thickness of first connectors 18a is different from a thickness of second connectors 18b. Further, a thickness of thick portions 16a is different from a thickness of thin portion 16b. The present example of variations has an effect that is similar to an effect of a third exemplary embodiment. Further, since the sheets are stacked together, busbar 2 that has different thicknesses is more easily made.

Third Exemplary Embodiment

A battery module according to a third exemplary embodiment and the battery module according to the first exemplary embodiment have a same configuration except for a difference in configuration between respective busbars. Hereinafter, a difference in configuration between the battery module according to the present exemplary embodiment and the battery module according to the first exemplary embodiment will be mainly described. A same configuration will be simply described, or will not be described.

Figure 5:
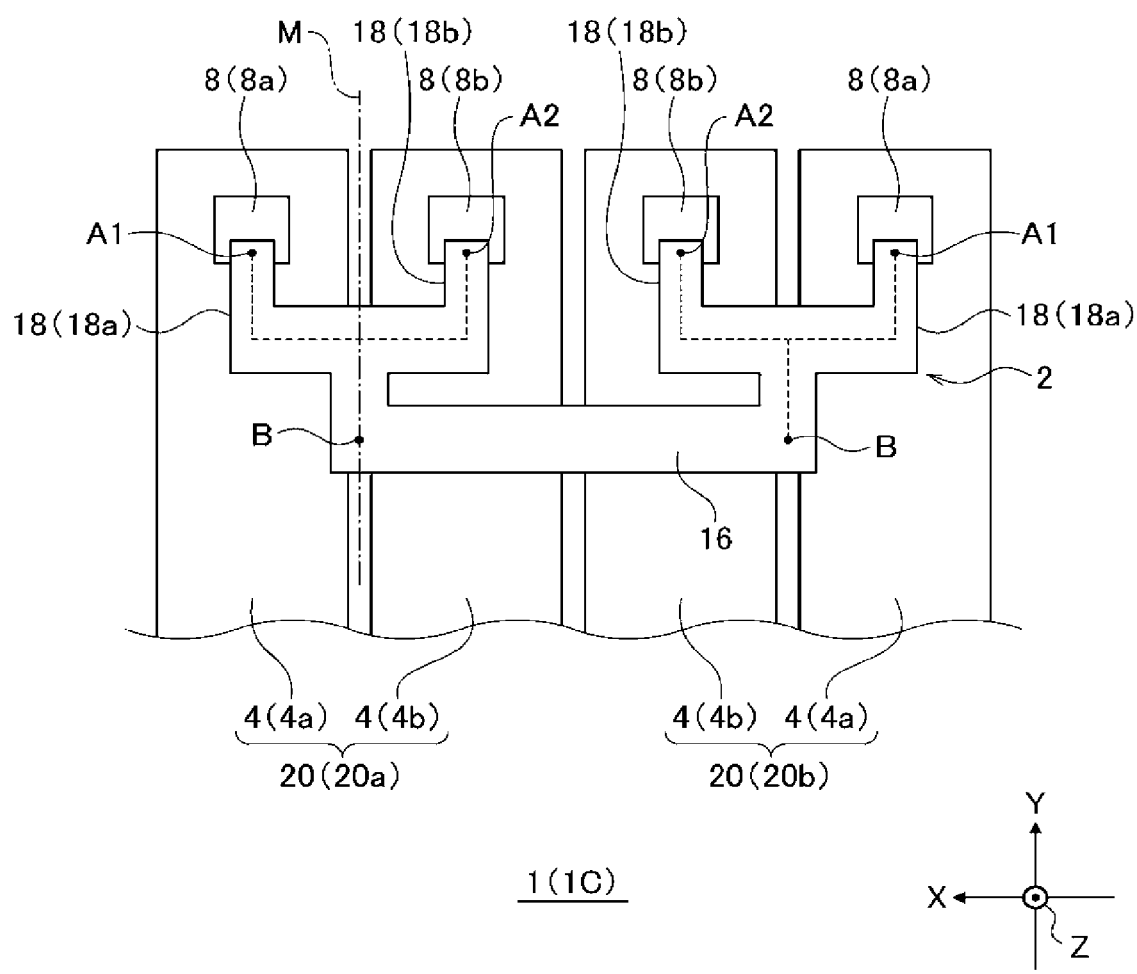
FIG. 5 is an enlarged schematic plan view that illustrates one of busbars in a battery module according to a third exemplary embodiment.

FIG. 5 is an enlarged schematic plan view that illustrates one of busbars in the battery module according to the third exemplary embodiment. In the present exemplary embodiment, busbar 2 of battery module 1 (1C) has main body 16 and a plurality of connectors 18. Main body 16 extends along axis X along which batteries 4 are stacked together. The plurality of connectors 18 are electrically connected with terminals 8 of batteries 4, respectively. Connectors 18 are arranged at predetermined intervals along an axis along which main body 16 extends (axis X along which batteries 4 are stacked together). Connectors 18 protrude from main body 16 along an axis that intersects with axis X along which batteries 4 are stacked together (horizontal axis Y).

Battery module 1 includes first battery unit 20a and second battery unit 20b. First battery unit 20a includes first battery 4a and second battery 4b that are stacked together. Second battery unit 20b includes first battery 4a and second battery 4b that are stacked together. Busbar 2 connects first battery 4a and second battery 4b of each of battery units 20 with each other in parallel. Further, busbar 2 connects first battery unit 20a with second battery unit 20b in series.

The plurality of connectors 18 include first connectors 18a and second connectors 18b. First connector 18a is connected with first battery 4a of first battery unit 20a. First battery 4a of first battery unit 20a is apart from second battery unit 20b. Further, second connector 18b is connected with second battery 4b of first battery unit 20a. Second battery 4b of first battery unit 20a is adjacent to second battery unit 20b. First connector 18a and second connector 18b do not have a same shape, but have different shapes. Consequently, a difference in electrical resistance between a path from first connection point A1 to third connection point B and a path from second connection point A2 to third connection point B is reduced. Busbar 2 is similarly connected with batteries 4 of second battery unit 20b.

In the present exemplary embodiment, first connector 18a and second connector 18b each have a shape like a crank, and each have two bends. First connector 18a has an end connected with terminal 8, extends from the end along horizontal axis Y, has a 90° bend, extends from the 90° bend toward second battery 4b, and extends along horizontal axis Y, and is connected with main body 16. Second connector 18b has an end connected with terminal 8, extends from the end along horizontal axis Y, has a 90° bend, extends from the 90° bend toward first battery 4a, and extends along horizontal axis Y, and is connected with main body 16. That is to say, first connector 18a and second connector 18b form a shape that has line symmetry. An axis of the line symmetry is line M. Line M passes through third connection point B and is parallel to horizontal axis Y. In other words, an end of first connector 18a is connected with an end of second connector 18b. The connected ends of first connector 18a and second connector 18b are connected with main body 16.

Consequently, a length from first connection point A1 to third connection point B is equal to a length from second connection point A2 to third connection point B. An area of a cross section of first connector 18a is equal to an area of a cross section of second connector 18b. Consequently, electrical resistance of first connector 18a from first connection point A1 to third connection point B is equal to electrical resistance of second connector 18b from second connection point A2 to third connection point B.

Heat generated by busbars 2 of battery module 1 according to the present exemplary embodiment has a weaker influence on batteries 4. Further, each of busbars 2 of battery module 1 according to the present exemplary embodiment reduces a difference in electrical resistance between a path through which electricity flows from first battery 4a to second battery unit 20b and a path through which electricity flows from second battery 4b to second battery unit 20b. Consequently, batteries 4 are more uniformly consumed.

Fourth Exemplary Embodiment

A battery module according to a fourth exemplary embodiment and the battery module according to the first or third exemplary embodiment have a same configuration except that the battery module according to the fourth exemplary embodiment includes busbars that each have a shape of a combination of the busbar according to the first exemplary embodiment and the busbar according to the third exemplary embodiment. Hereinafter, a difference in configuration between the battery module according to the present exemplary embodiment and the battery module according to the first exemplary embodiment will be mainly described. A same configuration will be simply described, or will not be described.

Figure 6:
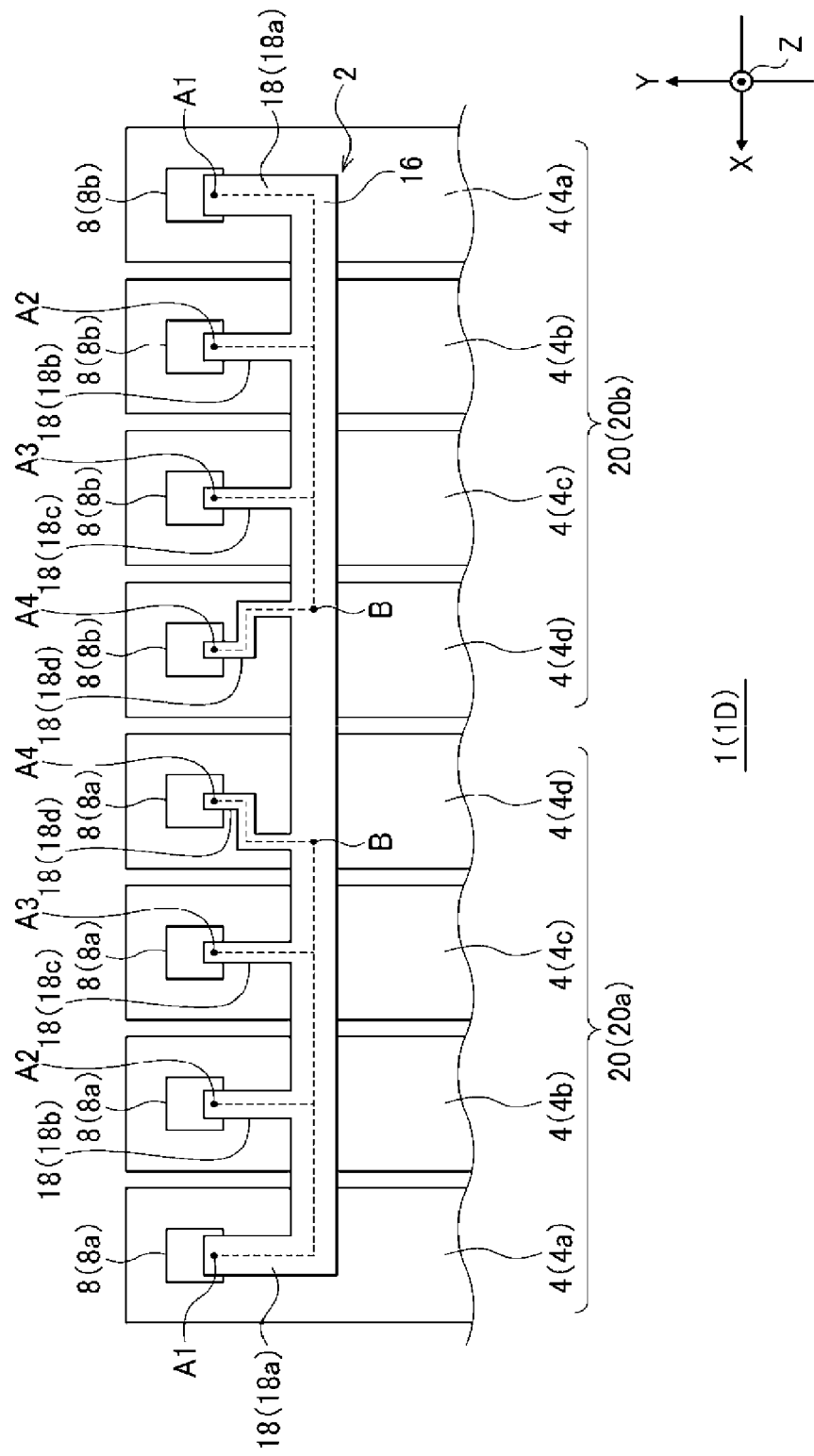
FIG. 6 is an enlarged schematic plan view that illustrates one of busbars in a battery module according to a fourth exemplary embodiment.

FIG. 6 is an enlarged schematic plan view that illustrates one of busbars in the battery module according to the fourth exemplary embodiment. In the present exemplary embodiment, busbar 2 of battery module 1 (1D) has main body 16 and a plurality of connectors 18. Main body 16 extends along axis X along which batteries 4 are stacked together. The plurality of connectors 18 are electrically connected with terminals 8 of batteries 4, respectively. Connectors 18 are arranged at predetermined intervals along an axis along which main body 16 extends (axis X along which batteries 4 are stacked together). Connectors 18 protrude from main body 16 along an axis that intersects with axis X along which batteries 4 are stacked together (horizontal axis Y).

Battery module 1 includes first battery unit 20a and second battery unit 20b. First battery unit 20a includes first battery 4a, second battery 4b, third battery 4c, and fourth battery 4d that are stacked together. Second battery unit 20b includes first battery 4a, second battery 4b, third battery 4c, and fourth battery 4d that are stacked together. Busbar 2 connects first to fourth batteries 4a to 4d of each of battery units 20 with each other in parallel. Further, busbar 2 connects first battery unit 20a with second battery unit 20b in series.

The plurality of connectors 18 include first connectors 18a, second connectors 18b, third connectors 18c, and fourth connectors 18d. First connector 18a is connected with first battery 4a of first battery unit 20a. In first battery unit 20a, first battery 4a is the most apart from second battery unit 20b. Second connector 18b is connected with second battery 4b of first battery unit 20a. In first battery unit 20a, second battery 4b is adjacent to first battery 4a. Third connector 18c is connected with third battery 4c of first battery unit 20a. In first battery unit 20a, third battery 4c is adjacent to second battery 4b. Fourth connector 18d is connected with fourth battery 4d of first battery unit 20a. In first battery unit 20a, fourth battery 4d is the closest to second battery unit 20b. First to fourth connectors 18a to 18d do not have a same shape, but have different shapes. Consequently, differences in electrical resistance between a path from first connection point A1 where first connector 18a is connected with terminal 8 to third connection point B, a path from second connection point A2 where second connector 18b is connected with terminal 8 to third connection point B, a path from third connection point A3 where third connector 18c is connected with terminal 8 to third connection point B, and a path from fourth connection point A4 where fourth connector 18d is connected with terminal 8 to third connection point B are reduced. Busbar 2 is similarly connected with batteries 4 of second battery unit 20b.

In the present exemplary embodiment, an area of a cross section of first connector 18a, an area of a cross section of second connector 18b, and an area of a cross section of third connector 18c are different from each other. More specifically, a width of second connector 18b is smaller than a width of first connector 18a. Further, a width of third connector 18c is smaller than a width of second connector 18b. Further, a width of fourth connector 18d is equal to a width of third connector 18c. Further, fourth connector 18d has a shape like a crank, and has two bends. Consequently, fourth connector 18d is longer than third connector 18c.

That is to say, an area of a cross section of third connector 18c is smaller than an area of a cross section of second connector 18b. Further, an area of a cross section of second connector 18b is smaller than an area of a cross section of first connector 18a. Consequently, differences in electrical resistance between a path through which electricity flows from first connection point A1 where first connector 18a is connected with first battery 4a to third connection point B, a path through which electricity flows from second connection point A2 where second connector 18b is connected with second battery 4b to third connection point B, and a path through which electricity flows from third connection point A3 where third connector 18c is connected with third battery 4c to third connection point B are reduced. Further, fourth connector 18d is longer than third connector 18c. Consequently, differences in electrical resistance between a path through which electricity flows from fourth connection point A4 where fourth connector 18d is connected with fourth battery 4d to third connection point B, the path through which electricity flows from first connection point A1 to third connection point B, the path through which electricity flows from second connection point A2 to third connection point B, and the path through which electricity flows from third connection point A3 to third connection point B are reduced.

Heat generated by busbars 2 of battery module 1 according to the present exemplary embodiment has a weaker influence on batteries 4. Further, differences in electrical resistance between a path through which electricity flows from first battery 4a to second battery unit 20b, a path through which electricity flows from second battery 4b to second battery unit 20b, a path through which electricity flows from third battery 4c to second battery unit 20b, a path through which electricity flows from fourth battery 4d to second battery unit 20b are reduced. Consequently, batteries 4 are more uniformly consumed.

Fifth Exemplary Embodiment

A battery module according to a fifth exemplary embodiment and the battery module according to the first exemplary embodiment have a same configuration except for a difference in configuration between respective busbars. Hereinafter, a difference in configuration between the battery module according to the present exemplary embodiment and the battery module according to the first exemplary embodiment will be mainly described. A same configuration will be simply described, or will not be described.

Figure 7:
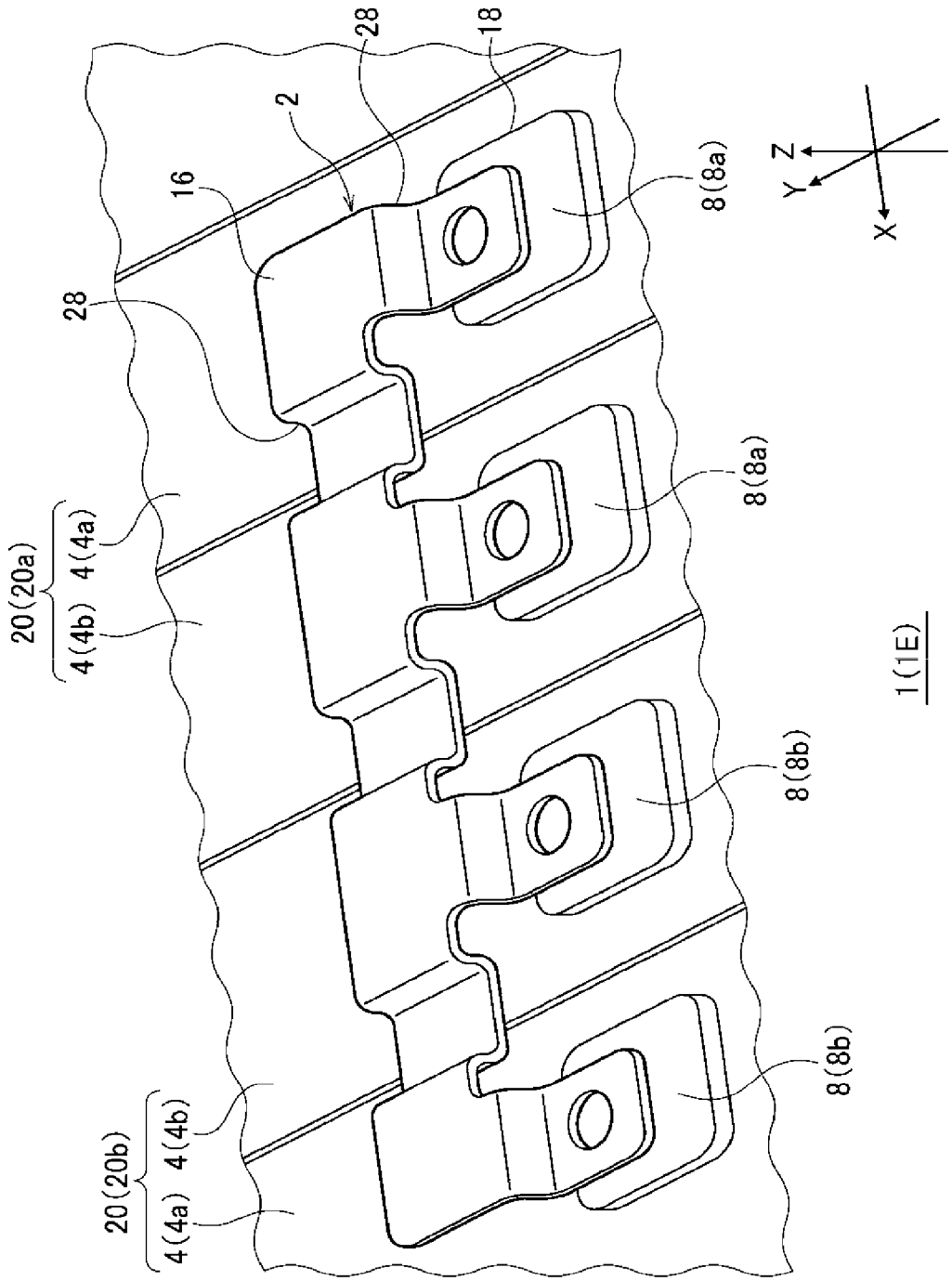
FIG. 7 is an enlarged perspective view that illustrates one of busbars in a battery module according to a fifth exemplary embodiment.

FIG. 7 is an enlarged perspective view that illustrates one of busbars in the battery module according to the fifth exemplary embodiment. In the present exemplary embodiment, busbar 2 of battery module 1 (1E) has main body 16 and a plurality of connectors 18. Main body 16 extends along axis X along which batteries 4 are stacked together. The plurality of connectors 18 are electrically connected with terminals 8 of batteries 4, respectively. Connectors 18 are arranged at predetermined intervals along an axis along which main body 16 extends (axis X along which batteries 4 are stacked together). Connectors 18 protrude from main body 16 along an axis that intersects with axis X along which batteries 4 are stacked together (horizontal axis Y).

Battery module 1 includes first battery unit 20a and second battery unit 20b. First battery unit 20a includes first battery 4a and second battery 4b that are stacked together. Second battery unit 20b includes first battery 4a and second battery 4b that are stacked together. Busbar 2 connects first battery 4a and second battery 4b of each of battery units 20 with each other in parallel. Further busbar 2 connects first battery unit 20a with second battery unit 20b in series.

Busbar 2 has displacement allowing portions 28 that allow relative displacement (=deviation, or movement) of batteries 4. Batteries 4 are electrically connected with each other by busbar 2. Part of each of displacement allowing portions 28 extends toward battery 4, or in a direction where a distance between battery 4 and displacement allowing portion 28 becomes close or apart. In the present exemplary embodiment, bases of connectors 18 are displacement allowing portions 28. The bases of connectors 18 are connected with main body 16. Displacement allowing portions 28 extend in a direction that intersects with XY plane. Displacement allowing portions 28 are made by bending the bases of connectors 18. In the present exemplary embodiment, a width of displacement allowing portions 28 is equal to a width of connectors 18. However, a width of displacement allowing portions 28 is not necessarily equal to a width of connectors 18. A position of main body 16 and positions of connectors 18 are different from each other along vertical axis Z. Displacement allowing portions 28 allow or absorb mainly displacement (=deviation, or movement) of batteries 4 along horizontal axis Y, and allow mainly dimensional variation in batteries 4 along horizontal axis Y.

Main body 16 also has displacement allowing portions 28 that extend in a direction that intersects with XY plane. Displacement allowing portions 28 of main body 16 are arranged along axis X along which batteries 4 are stacked together. Displacement allowing portions 28 of main body 16 are arranged between connectors 18. In the present exemplary embodiment, main body 16 is U-shaped and protrudes along vertical axis Z. Displacement allowing portions 28 of main body 16 are made by bending main body 16. In the present exemplary embodiment, a width (a dimension along horizontal axis Y) of displacement allowing portions 28 is equal to a width of main body 16. However, a width of displacement allowing portions 28 is not necessarily equal to a width of main body 16. Displacement allowing portions 28 of main body 16 allow mainly movement of batteries 4 along axis X along which batteries 4 are stacked together, and allow mainly dimensional variation in batteries 4 along axis X along which batteries 4 are stacked together. Displacement (=deviation, or movement) of batteries 4 along vertical axis Z and dimensional variation in batteries 4 along vertical axis Z are mainly allowed by variation in inclination of connectors 18, but may be allowed by displacement allowing portions 28.

Heat generated by busbars 2 of battery module 1 according to the present exemplary embodiment has a weaker influence on batteries 4. Further, busbars 2 are more securely connected with batteries 4. Consequently, the plurality of batteries 4 are more securely connected with each other. Further, in the present exemplary embodiment, areas of cross sections of connectors 18 may be different from each other, or lengths of connectors 18 may be different from each other. Consequently, differences in electrical resistance between paths through which electricity flows from batteries 4 may be reduced.

The present invention is not limited to the above exemplary embodiments. Some of the exemplary embodiments may be combined together. Alternatively, the exemplary embodiments may be modified based on knowledge of the person of ordinary skill in the art. For example, designs of the exemplary embodiments may be variously modified. If some of the exemplary embodiments are combined together, a resultant exemplary embodiment falls within the scope of the present invention. Further, if the exemplary embodiments are modified, resultant exemplary embodiments also fall within the scope of the present invention. If some of the exemplary embodiments are combined together, a resultant exemplary embodiment has effects of the exemplary embodiments that have been combined together. Further, if the exemplary embodiments are modified, resultant exemplary embodiments each have an additional effect of the modification.

In the above exemplary embodiments, batteries 4 are prismatic batteries. However, a shape of batteries 4 is not particularly limited and may be cylindrical, for example. Further, a total number of batteries 4 of battery module 1 is not particularly limited. A total number of battery units 20 of battery module 1 is not particularly limited. A number of batteries 4 of each of battery units 20 is not particularly limited. Further, exterior cans of batteries 4 may be each covered with an insulating sheet, such as a heat shrink tube.

The invention claimed is:

1. A battery module comprising:
   a plurality of batteries stacked together along a first direction, wherein each of the plurality of batteries includes a first terminal and a second terminal which are aligned along a second direction perpendicular to the first direction; and a busbar that electrically connects the plurality of batteries with each other, wherein the busbar has:

a main body that extends along the first direction; and a plurality of connectors that protrude from the main body along the second direction, and are electrically connected with terminals of the plurality of batteries, respectively, the plurality of batteries are divided into battery units, each of the battery units including at least two of the plurality of batteries, the busbar connects the at least two of the plurality of batteries of each of the battery units with each other in parallel through the main body, the busbar connects the battery units with each other in series through the main body, an upper surface of the main body includes a first region and second regions, which are arranged along the first direction, the main body including the first region and the second regions and the plurality of connectors are integrally formed as a one-piece bus bar, the first region and the second regions are arranged in parallel with connection portions of corresponding batteries to which the first region and the second regions are connected along the second direction, the first region is disposed closer to the battery units than each of the second regions in a third direction perpendicular to the first direction and the second direction, and two of the second regions are disposed at both end portions of the main body along the first direction and include two ends of the busbar along the first direction.

2. The battery module according to claim 1, wherein an area of a cross section of one of the plurality of connectors along the first direction is smaller than an area of a cross section of the main body along the second direction.

3. The battery module according to claim 1, wherein the plurality of connectors include a first connector and a second connector, the battery units include a first battery unit and a second battery unit that are connected with each other in series by the busbar, the first battery unit includes a first battery connected with the first connector, and a second battery connected with the second connector, the second battery is closer to the second battery unit than the first battery is, and the first connector and the second connector have a different electrical resistance from each other, and a difference in electrical resistance between a path from a connection point where the first connector is connected with the first battery to a connection point where the second connector is connected with the main body, and a path from a connection point where the second connector is connected with the second battery to the connection point where the second connector is connected with the main body, is reduced.

4. The battery module according to claim 3, wherein an area of a cross section of the first connector is different from an area of a cross section of the second connector.

5. The battery module according to claim 1, wherein the busbar has a displacement allowing portion that allows relative movement of the plurality of batteries electrically connected with each other by the busbar.

6. The battery module according to claim 5, wherein part of the displacement allowing portion extends in a direction where a distance between the plurality of batteries and the displacement allowing portion becomes close or apart.

7. The battery module according to claim 1, wherein the busbar has a shape that allows a section of the busbar that connects the battery units with each other in series to have electrical resistance that is lower than electrical resistance of a section of the busbar that connects the plurality of batteries with each other in parallel.

8. The battery module according to claim 1, wherein a part of the body that constitutes the second regions has lower electrical resistance than a part that constitutes the first region.

9. The battery module according to claim 1, wherein two of the plurality of connectors extend from the two of the second regions, respectively.

* * * * *